US007557956B2

(12) United States Patent
Hosokawa

(10) Patent No.: US 7,557,956 B2

(45) Date of Patent: Jul. 7, 2009

(54) METHOD OF FORMING LABEL WITH LABEL FORMING APPARATUS, AND LABEL FORMING APPARATUS

(75) Inventor: Takeshi Hosokawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 551 days.

(21) Appl. No.: 11/390,749

(22) Filed: Mar. 27, 2006

(65) Prior Publication Data

US 2006/0228150 A1 Oct. 12, 2006

(30) Foreign Application Priority Data

Apr. 7, 2005 (JP) ............................ 2005-111423

(51) Int. Cl.
*G06F 3/12* (2006.01)
*G06F 15/00* (2006.01)
*G06K 1/00* (2006.01)

(52) U.S. Cl. ....................... 358/1.9; 358/3.32; 358/296; 358/304

(58) Field of Classification Search .................. 358/1.1, 358/1.3, 1.4, 1.6, 1.9, 3.32, 1.13, 1.18, 296, 358/304; 101/3.1, 484
See application file for complete search history.

(56) References Cited

U.S. PATENT DOCUMENTS

2004/0211521 A1* 10/2004 Miyasaka .................. 156/384
2005/0221260 A1* 10/2005 Kikuchi et al. .............. 434/112

FOREIGN PATENT DOCUMENTS

JP 05-185695 7/1993
JP 11-301033 11/1999

* cited by examiner

*Primary Examiner*—Thomas D Lee
(74) *Attorney, Agent, or Firm*—Hogan & Hartson LLP

(57) ABSTRACT

A method of forming a label with a label forming apparatus having a printing section for performing printing while feeding a processing tape, and a working section for performing physical working on the processing tape while feeding the processing tape. The apparatus is capable of selectively performing print processing for performing printing, work processing for performing physical working, and print-and-work processing for performing printing and working on the processing tape based on inputted information. The apparatus is also capable of continuous processing for forming a single continuous label in which a plurality of labels are formed in series. The method includes allowing the continuous processing in the print processing and the work processing, and prohibiting the continuous processing in the print-and-work processing.

4 Claims, 11 Drawing Sheets

(NOTE: In Figs. 5A - 5C and others, characters "A, I, U" are transliteration of Japanese hiragana and that the embossed Braille characters in those figures correspond to Japanese hiragana, and not to alphabets.)

METHOD OF FORMING LABEL WITH LABEL FORMING APPARATUS, AND LABEL FORMING APPARATUS

The entire disclosure of Japanese Patent Application No. 2005-111423, filed Apr. 7, 2005, is expressly incorporated by reference herein.

BACKGROUND

1. Technical Field

The present invention relates to a method of forming a label with a label forming apparatus which is capable of performing print processing and physical work processing on an identical processing sheet, and also relates to a label forming apparatus. The term "work processing" or "physical work processing" is used in this specification to mean "performing a physical act or acts, processing, or treatment on an object to be subjected to the processing to produce some kind of change."

2. Related Art

In print processing of character array including numerals, there is known an apparatus for use in forming a plurality of labels which are attached with a plurality of serially numbered labels, by repeating the printing work while incrementing the counting number by one. In such a case, considering the ease with which the labels can be stored until the labels are used, the apparatus is configured such that a continuous label made up of a plurality of labels are connected to one another. JP-A-185695-1993 is an example of related art. Further, there is also known one which is made up of a printing section for performing ink-character printing on a processing tape and an embossing section for performing Braille embossing and in which a label can formed in a manner in which the ink characters and the Braille characters are disposed in parallel with each other so that the person having an ordinary eyesight can also understand the meaning of the Braille characters. JP-A-301033/1999 is an example of related art.

From these two conventional art, it may be considered to configure a label forming apparatus in which continuous labels can be formed by performing print processing and emboss processing. In this case, if a print-feed mechanism and an emboss-feed mechanism of the processing tape are used in common with each other, when embossing device performs embossing operation, the processing tape is likely to get off from a thermal head due to the embossing vibrations, thereby bringing about a problem in that the printing quality of the ink characters becomes poor. To avoid such a problem, the feeding mechanism will have to be provided independent of each other. In such a configuration, however, there will arise an error (feeding error) in the amount of tape feeding by the print-feeding mechanism and the amount of tape feeding by the emboss-feeding mechanism. Therefore, in case a continuous label is formed by performing both printing and embossing (also referred to as print-and-emboss processing), there will occur a problem of a displacement in the tape feeding direction between the print-processed portion (ink-character array) and the emboss-processed portion (Braille-character array) in each of the labels, the deviation becoming conspicuous toward the rear end of the continuous label.

SUMMARY

It is an advantage of the invention to provide a method of forming a label with a label forming apparatus without the possibility of forming a label in which the print-processed portion and the emboss-processed portion are displaced from each other as seen in the tape feeding direction. It is also an advantage to provide a label forming apparatus.

According to one aspect of the invention, there is provided a method of forming a label with a label forming apparatus. The apparatus comprises: a printing section for performing printing while feeding a processing tape; a working section for performing physical working on the processing tape while feeding the processing tape, the apparatus being capable of selectively performing print processing for performing printing, work processing for performing physical working, and print-and-work processing for performing printing and working on the processing tape based on inputted information, and also being capable of continuous processing for forming a single continuous label in which a plurality of labels are formed in series. The method comprises: allowing the continuous processing in the print processing and the work processing; and prohibiting the continuous processing in the print-and-work processing.

It is another advantage of the invention to provide a label forming apparatus (or an apparatus for forming a label). The apparatus comprises: a printing section for performing printing while feeding a processing tape; a working section for performing physical working on the processing tape while feeding the processing tape, the apparatus being capable of selectively performing print processing for performing printing, work processing for performing physical working, and print-and-work processing for performing printing and physical working on the processing tape based on inputted information, and also being capable of continuous processing for forming a single continuous label in which a plurality of labels are formed in series, the apparatus including: a processing selection device for selecting from among the print processing, the work processing, and print-and-work processing; a control device for controlling the printing section and the working section, wherein the control device allows the continuous processing when the print processing and the work processing are selected, and prohibits the continuous processing when the print-and-work processing is selected.

According to the above configuration, in the print-and-work processing, both printing and working are performed on the processing tape. If continuous processing is performed, there will occur a displacement between the printed portion (i.e., the portion subjected to print processing) and the worked portion (i.e., the portion subjected to the work processing) due to the feeding error between the printing section and the working section. This displacement becomes especially remarkable towards the rear end of the continuous label. Therefore, continuous processing is prohibited. As a result, there is no possibility of forming a plurality of labels in which displacement has occurred from one another in the tape feeding direction. On the other hand, in the print processing and the work processing, only one of the printing and the working is performed on the processing tape. It follows that, even if the continuous processing is performed, there is no possibility of displacement between the printed portion and the worked portion in each of the labels. Therefore, the continuous processing is allowed. As a result, a plurality of labels (a continuous label) can be formed in an easy operation and they can be easily and conveniently stored.

It is preferable that the above-referenced method of forming a label with a label forming apparatus further comprises individual processing of forming a plurality of labels in succession as individual labels in the print-and-work processing based on prohibition of the continuous processing.

It is preferable that, in the above-referenced label forming apparatus, when the print-and-work processing is selected, the control device performs individual processing of forming a plurality of labels in succession as individual labels based on prohibition of the continuous processing.

According to the above configuration, in the print-and-work processing, individual processing is performed in place of the continuous processing. As a result, it is possible to form a plurality of labels without the occurrence of displacement between the printed portion and the worked portion in each of the labels. Therefore, a plurality of labels can be formed in an adequate manner whichever of the print-and-work processing, and print-and-work processing may be selected.

In the above-referenced label forming apparatus, it is preferable that the processing tape is a tape wound into a roll. The printing section further includes a cutting device for cutting the processing tape, wherein, in the work processing and the print-and-work processing, physical working is performed by the working section on a piece of the processing tape formed by passing through the printing section, and the control device controls the cutting device to perform cutting of the processing tape at a rear end of the continuous label in the continuous processing and to perform cutting of the processing tape at a rear end of each of the labels in the individual processing.

According to this configuration, in the work processing and print-and-work processing, the cutting of the processing tape is performed by the cutting device when the processing tape passes through the printing section, thereby obtaining the piece of the processing tape to be subjected to the work processing at the working section. In the continuous processing, the rear end of the continuous label is cut by the cutting device, thereby cutting off from the processing tape a continuous label (tape piece) of an appropriate length. Similarly, in the individual processing, the rear end of the respective labels can be cut by the cutting device, thereby cutting off from the processing tape a plurality of labels (pieces of tape) of an adequate length.

In this case, it is preferable that the processing tape is made up of a tape main body and a release tape. The printing section further includes a half cutter for cutting only the tape main body, and the control device controls the half cutter to perform half cutting in which a border of the plurality of respectively adjoining labels is half-cut in the continuous processing and the half cutting is prohibited in the continuous processing of the work processing.

According to this configuration, in the print processing, half cutting is performed on the border of the plurality of respectively adjoining labels, whereby the integrity (ease with which the labels can be stored) as the continuous label can be maintained. When in use, the user can peel off the tape main body at the half-cut portion without using a pair of scissors, or the like, thereby easily obtaining each label (tape main body). On the other hand, in the work processing, half-cutting is not performed on the border of the plurality of respectively adjoining labels. Therefore, there is no possibility of forming a label in which a displacement has occurred between the half-cut portion and the work-processed portion.

In the above-referenced cases, it is preferable that the processing section further comprises an embossing device for embossing Braille characters on the processing tape.

According to this configuration, there is no possibility of forming a plurality of labels containing ink characters and Braille characters in parallel with each other, in which the printed portion and the embossed portion are displaced from each other.

In the above-referenced cases, it is preferable that the working section includes a cutting device for half-cutting the tape main body of the processing tape into an arbitrary punched shape.

According to this configuration, there is no possibility of forming a plurality of labels in which the printed portion and the cut portion deviate in position from each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, a description will now be made about an apparatus for forming a label (also referred to as a label forming apparatus) to which this invention is applied. This label forming apparatus is a complex apparatus which performs printing of ink characters (i.e., characters printed with ink) on a processing tape (i.e., a tape to be subjected to various processing) to be paid out of a tape cartridge mounted on the apparatus, and which also performs embossing of Braille characters on a tape piece (or a piece of tape) to be manually inserted into the apparatus.

Figure 1:
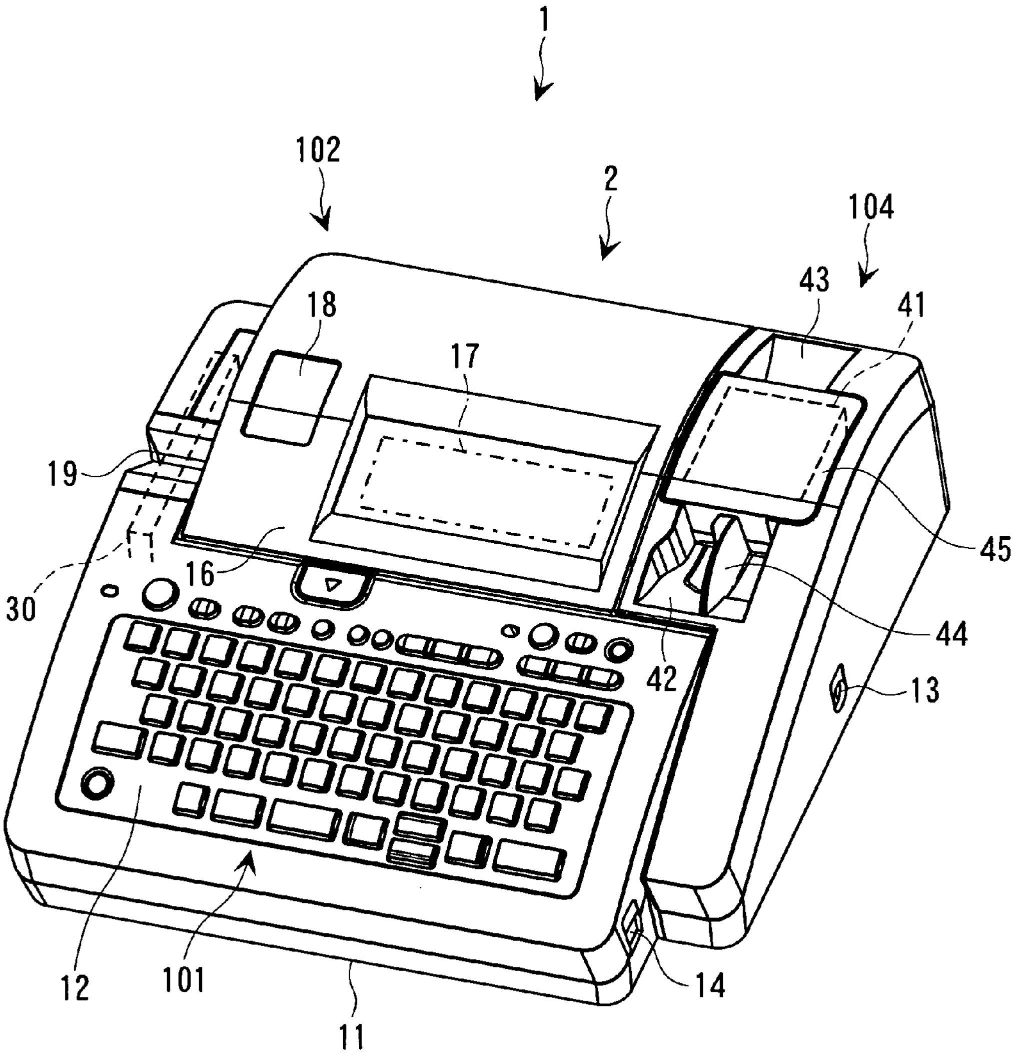
FIG. 1 is a perspective outside view of a label forming apparatus with its lid kept closed.
Figure 2:
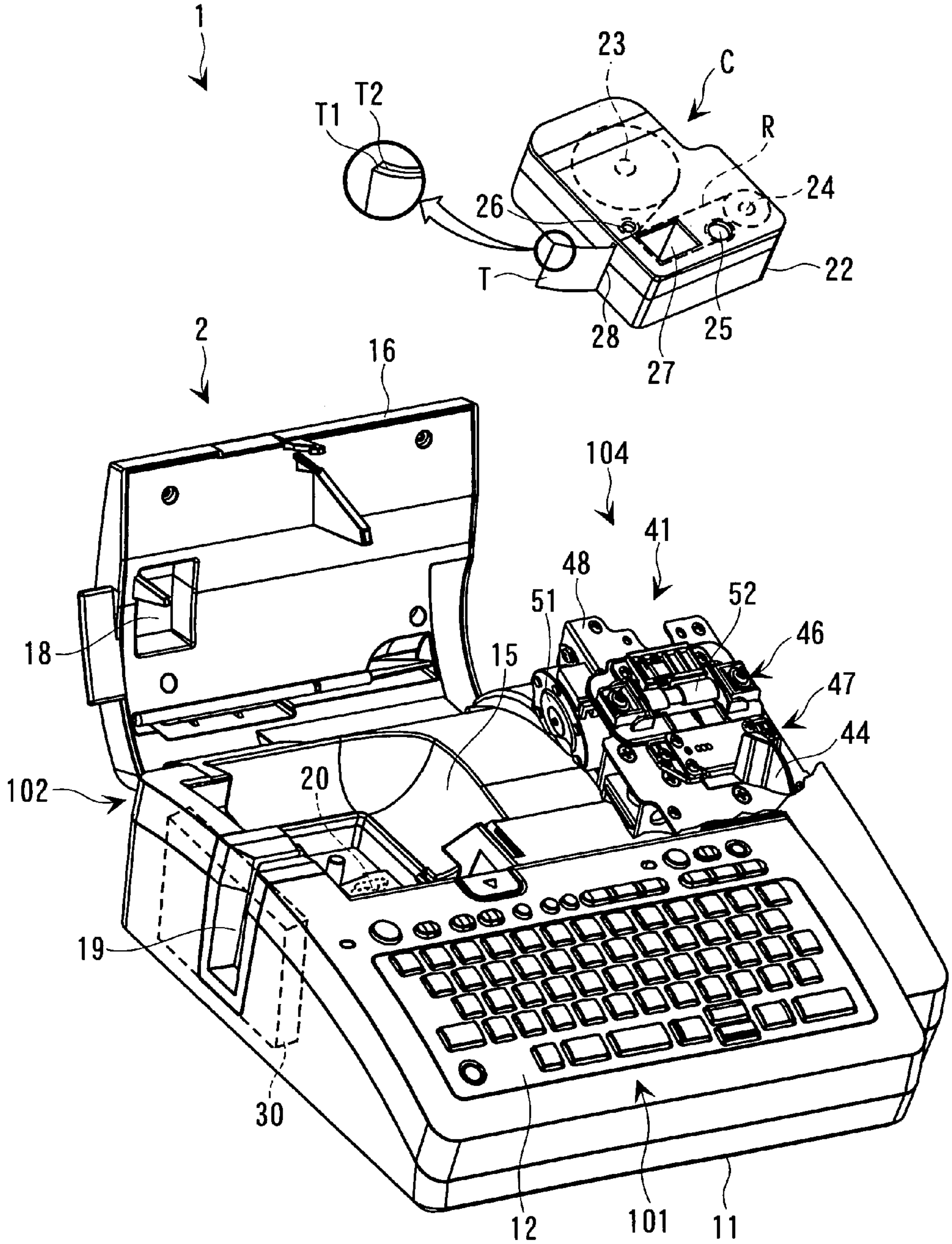
FIG. 2 is a perspective outside view of the label forming apparatus with the lid left open.

FIG. 1 is an outside perspective view of a label forming apparatus 1 with its lid being closed. FIG. 2 is an outside perspective view of the label forming apparatus 1 with its lid left open. As shown in FIGS. 1 and 2, the label forming apparatus 1 is made up of: an apparatus main body 2 which performs printing of ink characters and embossing of Braille characters on a processing tape T; and a tape cartridge C which contains therein the processing tape T and an ink ribbon R and which is detachably mounted on the apparatus main body 2.

The apparatus main body 2 has an outer shell made of an apparatus casing 11 which is divided into an upper part and a lower part. On an upper surface of a front half of the apparatus casing 11, there is disposed a keyboard 12 which constitutes an operating section 101. On a left side of the rear half portion of the apparatus casing 11, there is constituted a printing section 102 and, on a right side of the rear half portion of the apparatus casing 11, there is constituted an embossing section 104. Although not shown, there is mounted inside the apparatus casing 11 a circuit board which constitutes a driving section 106, a control section 107, or the like (see FIG. 3) which are described in detail hereinafter. On the right side of the apparatus casing 11, there is formed a power supply port 13 for supplying electric power to the label forming apparatus 1 and a connection port 14 (interface) for connecting the label forming apparatus 1 to an external apparatus such as a personal computer, or the like (not shown).

The printing section 102 has formed therein in a recessed manner a cartridge mounting section 15 which forms the portion in which the tape cartridge C is mounted. The cartridge mounting section 15 is provided with an open/close lid 16 which opens and closes the section 15. On a front surface of the open/close lid 16, there are formed: a rectangular display 17 which displays the results of inputting, or the like through the keyboard 12; and a peep hole 18 which is used to visually confirm the mounting or absence of the cartridge C in a state of keeping the open/close lid 16 closed.

On the left side of the apparatus casing 11, there is formed a print-tape ejecting slot 19 which communicates the cartridge mounting section 15 and the outside. A cutter unit 30 for cutting the processing tape T paid out of the cartridge C lies close to this print-tape ejecting slot 19. By cutting a rear end (trailing edge) portion of the processing tape T by means of a full cutter 32 (to be described in detail hereinafter) of the cutter unit 30, a tape piece Ta having printed thereon ink characters (see FIGS. 5A to 5C) is discharged out of the print-tape ejecting slot 19.

In the cartridge mounting section 15 there are disposed a printing head 20 (thermal head) which has a heating element and which is covered with a head cover; and a platen drive shaft (not shown) which feeds the processing tape T of the tape cartridge C and the ink ribbon R. On the rear side of the cartridge mounting section 15, there are built in a printing feed motor 21 (see FIG. 3) which drives a platen drive shaft and a take-up drive shaft, as well as a gear train, or the like.

The tape cartridge C is formed by housing inside a cartridge case 22, which is divided into an upper part and a lower part: a tape core 23 around which is wound the processing tape T; a ribbon feeding roll 24 around which is wound the ink ribbon R and a ribbon take-up reel 25; and a platen roller 26 which is constituted by a rubber roller. When the tape cartridge C is mounted on the cartridge mounting section 15, the printing head 20 is inserted from the apparatus side into a through hole 27 of the tape cartridge C. Also, the platen drive shaft and the take-up drive shaft are brought into engagement with the platen roller 26 and the ribbon take-up reel 25, respectively. The printing head 20 thus comes into contact with the platen roller 26 with the processing tape T and the ink ribbon R being sandwiched therebetween, thereby enabling the printing of ink characters.

Then, while feeding the processing tape T by driving the platen roller 26, the printing of the ink characters (i.e., printing of character string of letters, marks, or the like) is performed based on the character data (ink character data) prepared in the control section 107 corresponding to the character information as inputted from the keyboard 12, or the like. After printing of the ink characters has been finished, only the processing tape T is discharged to the outside from the tape discharge slot 28 of the tape cartridge C. The ink ribbon R is taken up inside (by the ribbon tale-up reel 25).

The processing tape T is fed by a cut length which is set based on the ink-character data (length of the print-processing region), Braille-character data (length of emboss-processing region), or the like, to be prepared by the inputted character information, or is fed by a cut length which is set based on the label length to be designated by the user. The processing tape T is then cut at the rear end thereof. Therefore, an appropriate length of the label La can be cut off from the paid out processing tape T. It is, however, to be noted that the tape feed amount may vary to some degree (e.g., ±2%) as compared with the design value due to slippage between the platen roller 26 and the processing tape T, or due to settling of the platen roller 26, or the like.

The processing tape T is prepared in two kinds of tape widths (12 mm, 24 mm). The tape width of 12 mm is made to correspond to the height of one Braille cell (i.e., minimum width that allows for embossing). With the processing tape T of 12 mm width, the print-processing region (ink-character array) and the emboss-processing region (Braille array) are disposed in a back-and-forth (or in an overlapped) positional relationship on the processing tape T. With the processing tape of 24 mm width, on the other hand, the print-processing region and the emboss-processing region are disposed in two stages in an upper-half/lower-half positional relationship on the processing tape T. Although description will be made in detail hereinafter, the upper-half area of the processing tape T is the print-processing region and the lower-half area is the emboss-processing region. In addition, the processing tape T is a release paper which is made up of a tape main body T1 (recording tape or a tape on which recording is made) and a release tape T2 which is adhered to the tape main body T1.

Although not shown, a plurality of small holes to be detected are formed on a rear surface of the cartridge case 22. These plurality of holes are identified by a tape identifying sensor 29 (microswitch, see FIG. 3) which is provided at a corner of the cartridge mounting section 15, thereby detecting the kind of the processing tape T and also the fact that the processing tape T is mounted in position.

The cutter unit 30 is disposed between the cartridge mounting section 15 and the print-tape ejecting slot 19. The cutter unit 30 is provided with: a full cutter (cutting device) 32 which is driven by the full-cutter motor 31 and cuts both the tape main body T1 and the release tape T2 of the processing tape T in the style of a pair of scissors; and a half cutter 34 which cuts only the tape main body T1 in the style of a pair of scissors equipped with a stopper (see FIG. 3). The term "half cutter or half cutting" means that the cutting is made such that only the release tape remains uncut even if a cutting line may, or may not, be formed on the release tape to a certain depth.

Figure 7:
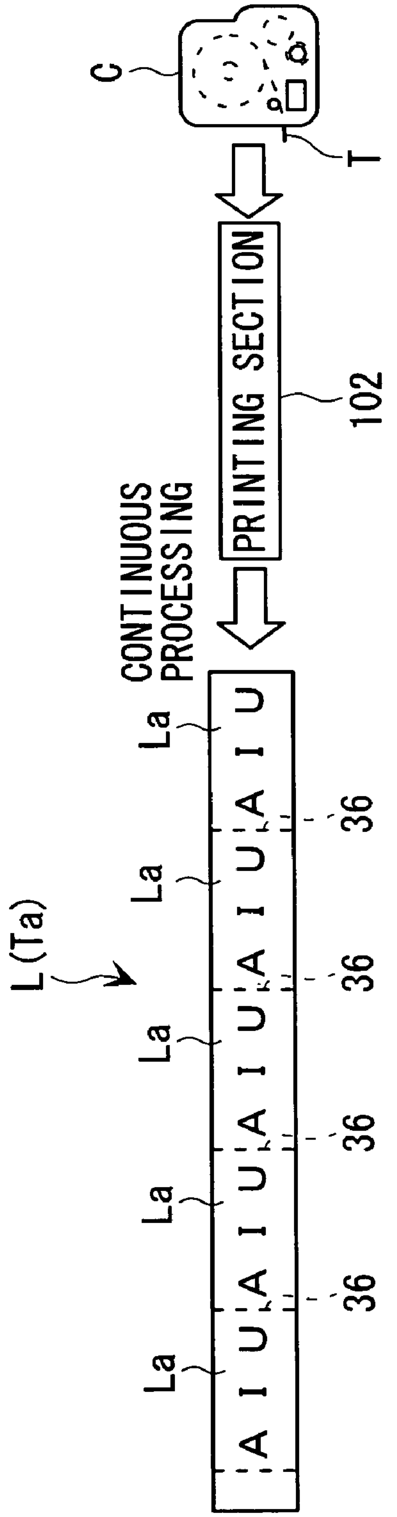
FIG. 7 is a diagram schematically showing the continuous processing in the print processing of the label forming apparatus.
Figure 8:
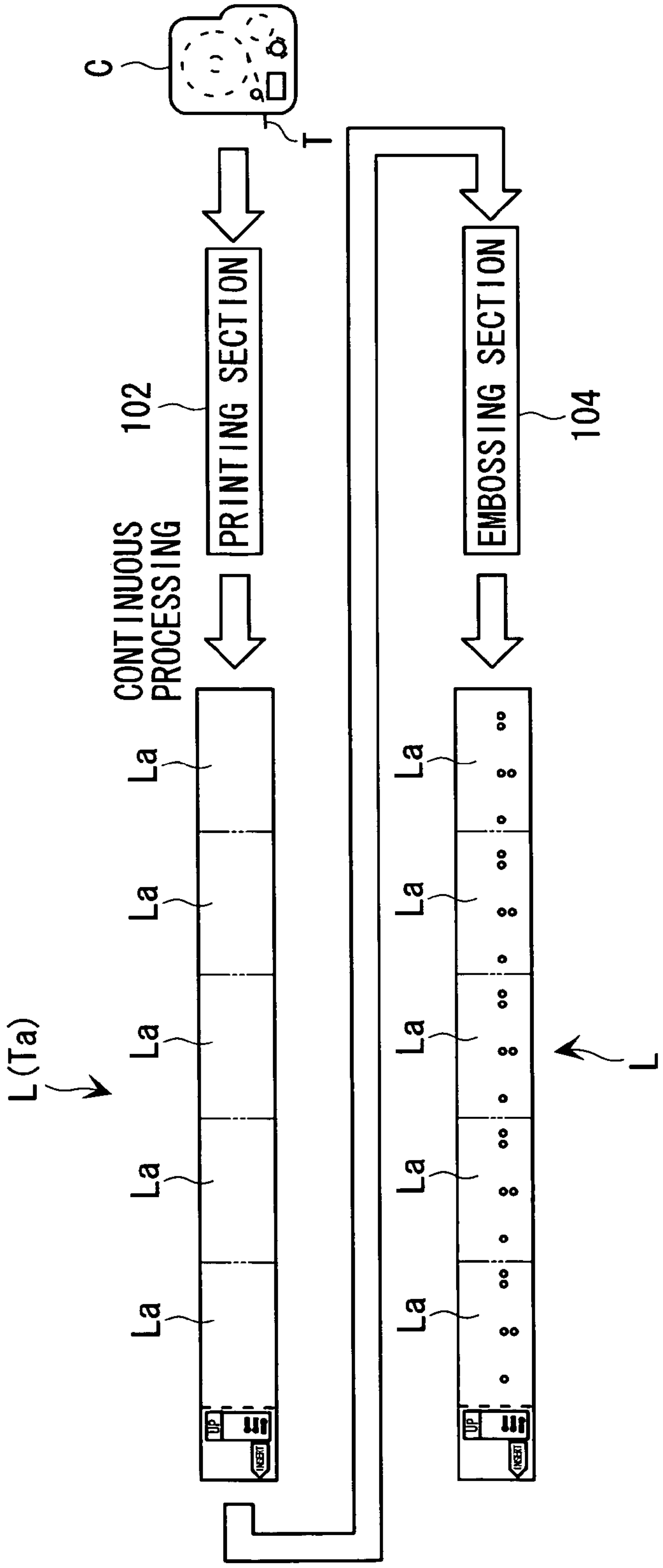
FIG. 8 is a diagram schematically showing the continuous processing in the emboss processing of the label forming apparatus.
Figure 9:
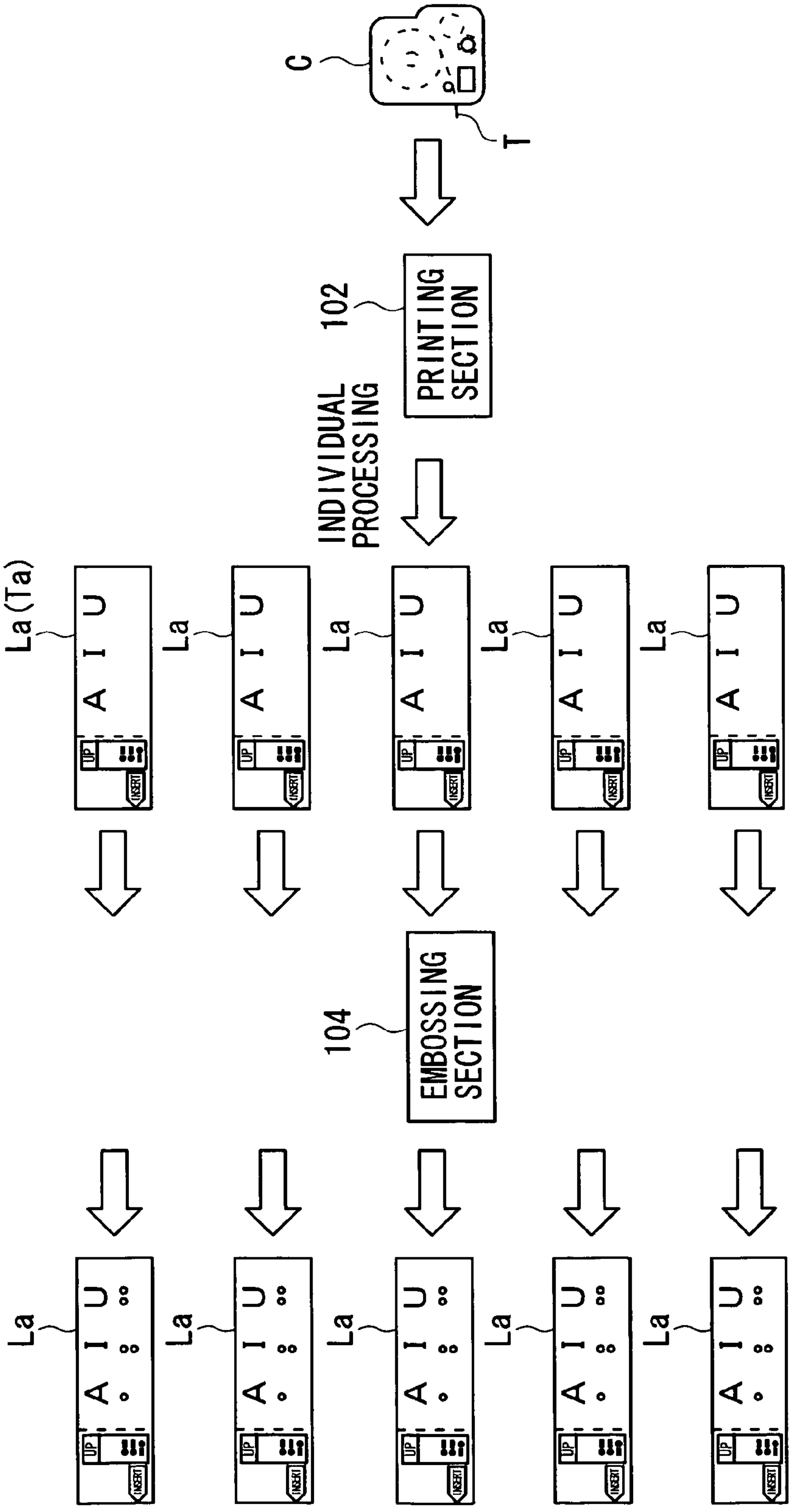
FIG. 9 is a diagram schematically showing an individual processing in the print-and-emboss processing of the label forming apparatus.
Figure 10:
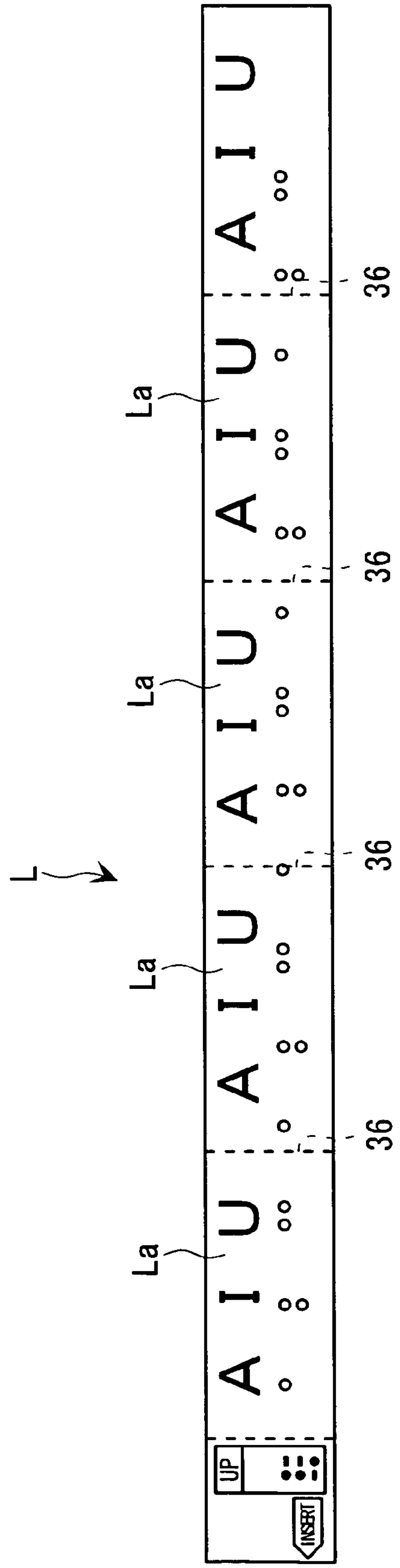
FIG. 10 is a diagram schematically showing the continuous processing in the print-and-emboss processing of the label forming apparatus.

It is thus so arranged that, by means of this half cutter 34, a half-cut line 35 can be formed at a predetermined position (e.g., 15 mm) from a front end (or a leading edge) of the processing tape T. Due to this half-cut line 36, the tape main body T1 is divided into a waste margin (or waste portion) 37 and the label portion 38 which becomes the object to be attached to something else (see FIGS. 5A to 5C), or else, the labels La which are adjoining to one another are partitioned in the continuous processing which is described in detail hereinafter. (see FIG. 7).

The embossing section 104 is made up of: an embossing assembly 41 which constitutes the main body of the embossing section 104; an emboss-tape inserting portion 42 into which is manually inserted a tape piece (or a piece of tape) Ta to be embossed, from a front end (or a leading edge) thereof with the printed surface looking upward, and which lies closer to the operator of the apparatus 1 relative to the embossing assembly 41; and an embossed-tape ejecting portion 43 out of which the tape piece Ta having embossed thereon with Braille characters is ejected rearward (i.e., in a direction away from the operator) and which lies on the opposite side of the embossing assembly 41 as seen in the direction of flow of the tape Ta. The emboss-tape inserting portion 42 is provided with a manual insertion guide 44 whose width can be adjusted. In the figure, reference numeral 45 denotes an emboss-section cover to cover the embossing assembly 41.

The embossing assembly 41 is to form embossing salient which constitutes a so-called six-point Braille on the piece of ejected tape Ta, and is made up of: a tape feed unit 46 for feeding the tape piece Ta inserted from the emboss-tape inserting portion 42 toward the embossed-tape ejecting portion 43; an embossing unit 47 for performing embossing of Braille characters on the tape piece Ta to be fed; and a base 48 frame for supporting the tape feed unit 46 and the embossing unit 47.

The tape feed unit 46 is constituted by a grip roller 52 which is made up of a driving roller (rubber roller) to be driven by an embossing feed motor 51 and a driven roller. In a similar manner as the feeding mechanism of the above-referenced printing section 102, the tape feed amount may vary to some degree (e.g., ±2%) as compared with the design value due to slippage between the grip roller 52 and the processing tape T, or due to settling of the grip roller 52, or the like.

The embossing unit 47 is arranged to form embossing salient on the tape piece Ta by selectively lifting three embossing pins 54 with three solenoids 53 serving as the driving source. This selective lifting is performed based on the character data (embossing data) formed to correspond to the character information inputted through the keyboard 12, or the like (see FIG. 3). The three embossing pins 54 are disposed to form embossing salient on the left side (as seen in the direction of feeding, i.e., on the lower-half area) of the inserted tape piece Ta.

The keyboard 12 is used in inputting various designations and data into the control section 107. The keyboard 12 has arranged therein alphabet key group, mark key group, numeral key group, character key group inclusive of Japanese hiragana and katakana key group, function key group for designating various functions, or the like.

The function key group includes: a "selection" key for entering data and shifting line at the time of text inputting and selection/designation of various modes in selection screen; a "print" key for starting printing operation; an "emboss" key for starting embossing operation; a "continuous-process" key for calling up continuous-processing menu which is described in detail hereinafter; or the like.

Figure 3:
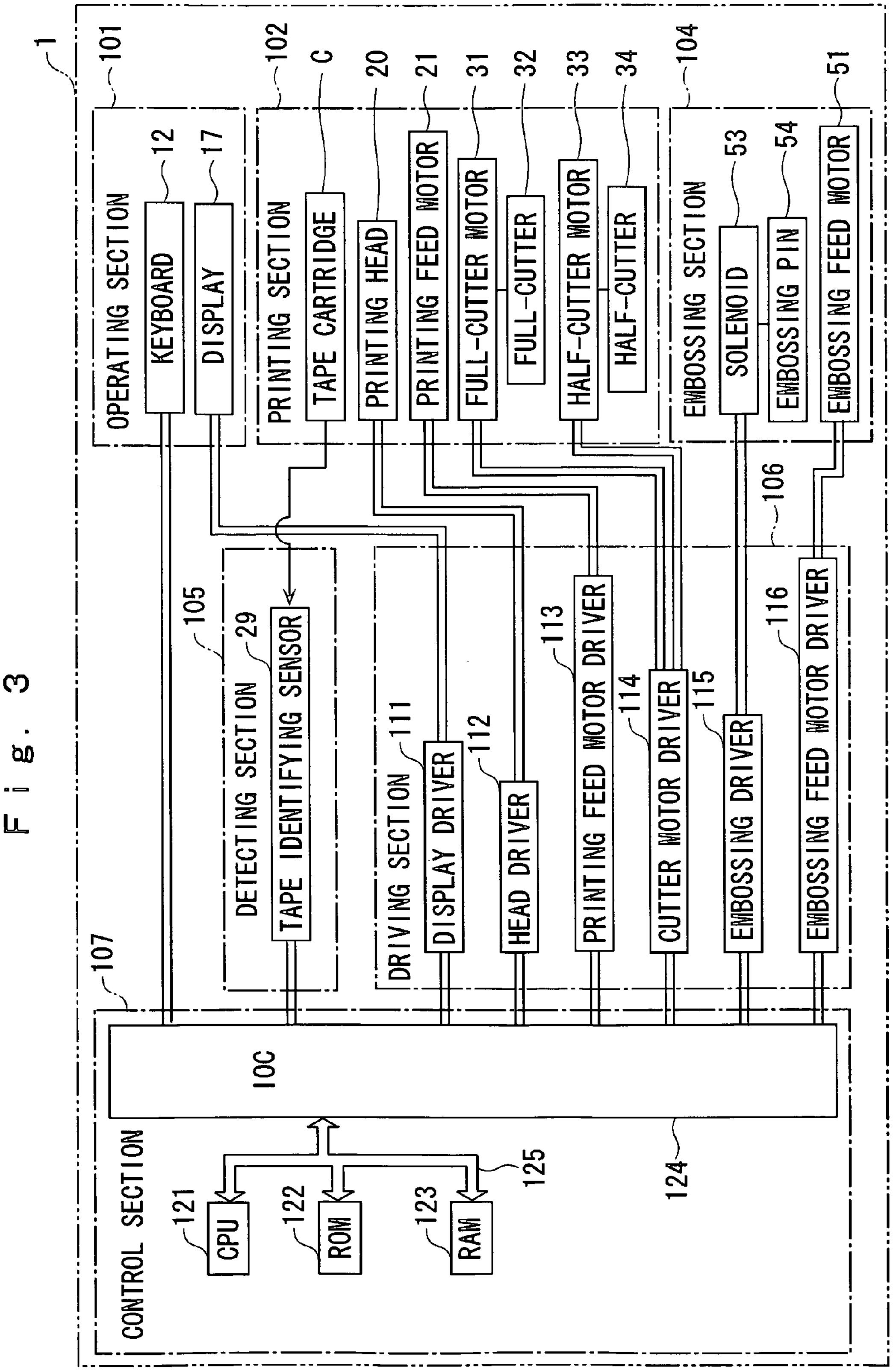
FIG. 3 is a block diagram showing a control system of the label forming apparatus.

With reference to FIG. 3, a description will now be made about the constitution of the control system of the label forming apparatus 1. The label forming apparatus 1 is made up of: an operating section 101 which has the keyboard 12 and the display 17 and which governs the user interface such as inputting of characters by the user and displaying of various pieces of information, or the like; the printing section 102 which has the printing head 20 and the printing feed motor 21 so as to perform printing of ink data based on the inputted character information, on the processing tape T while feeding the processing tape T and the ink ribbon R and which also has the full cutter 32 and the half cutter 34 as well as the full-cutter motor 31 and the half-cutter motor 33 for driving the same and which performs full cutting and half cutting on the processing tape T; the embossing section 104 which has the embossing feed motor 51, the solenoids 53, and the embossing pins 54 and which performs embossing of Braille data on the tape piece Ta while transporting the same based on the character information; a detecting section 105 which has various sensors such as the tape identifying sensor 29, or the like; the driving section 106 which has a display driver 111, a head driver 112, a printing feed motor driver 113, a cutter motor driver 114, an embossing driver 115, and an embossing feed motor driver 116 and which performs driving of each section; and the control section 107 which is connected to each section to perform the controlling of the entire label forming apparatus 1.

The control section 107 has a CPU 121, a ROM 122, a RAM 123 and an input output controller (10C) 124 and is connected to one another through an internal bus 125. The CPU 121 inputs various signals and data from each section of the label forming apparatus 1 based on a control program inside the ROM 122 through the IOC 124. In addition, by processing various data inside the RAM 123 based on the inputted various signals and data and by outputting the various signals and data to each section inside the label forming apparatus 1 through the IOC 124, the control, or the like of the ink-character processing and the Braille-character processing are controlled.

As shown in FIGS. 4 and 5A to 5C, a selection is made in the label forming apparatus 1 from among the following modes by the selection command from the keyboard 12, or the like. The modes in question are: a print-and-emboss processing mode in which ink-character printing and Braille embossing are performed; a print-processing mode in which only printing of ink characters is performed; and an emboss-processing mode in which only the Braille embossing is performed (strictly speaking, printing of an insert-direction mark 37*a* to be described in detail hereinafter is also performed). Based on the selection of the mode, the print-and-emboss processing, the print processing, and the emboss processing is selectively performed.

Figure 4:
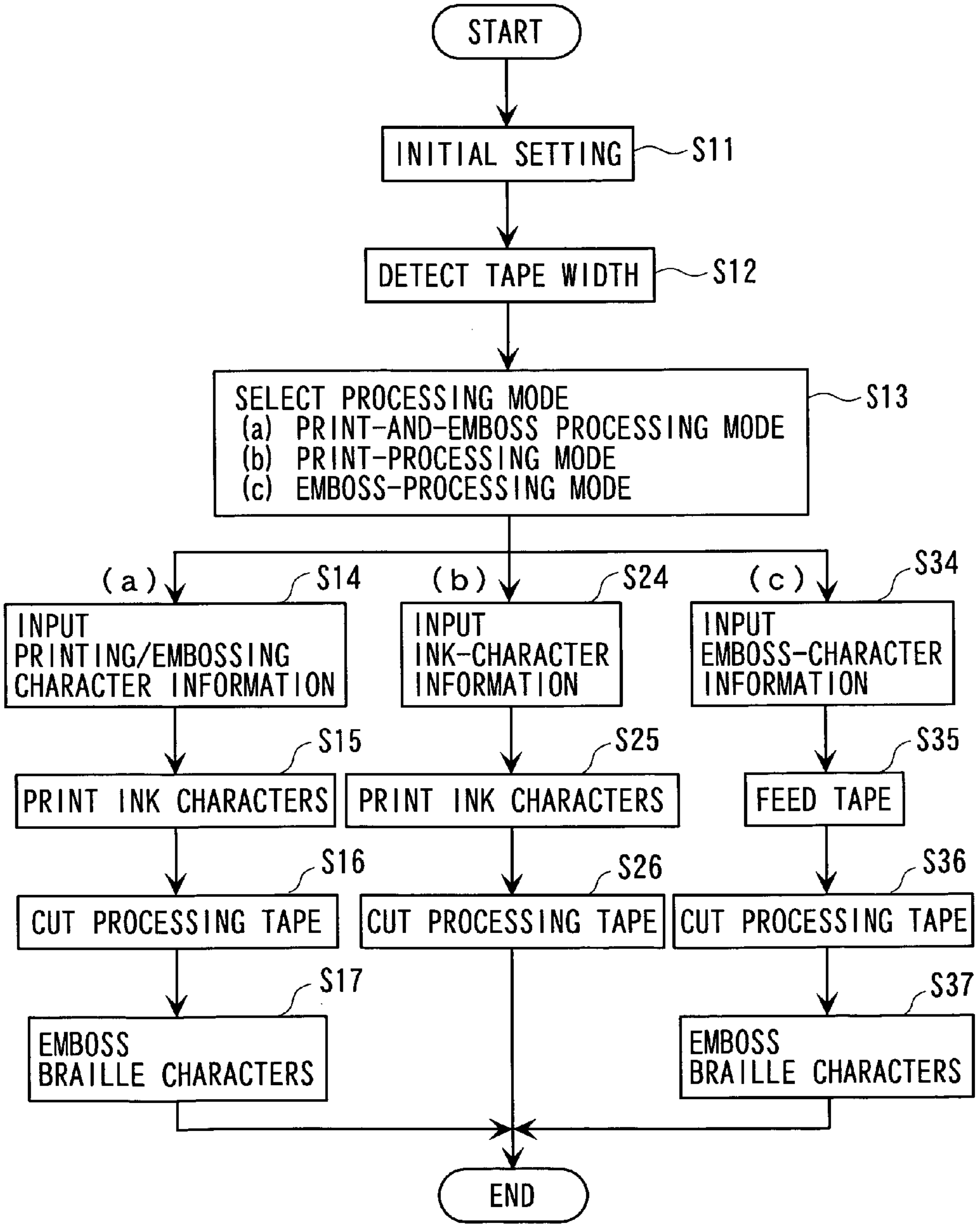
FIG. 4 is a flow chart showing an overall processing of the label forming apparatus.

As shown in FIG. 4, when the processing is started with the depression of a power switch (power ON), an initial setting such as restoring each of the saved flags is performed to thereby restore the state to the last power OFF (S11), and the kind of the tape (tape width) is detected by the tape identifying sensor 29 (S12). In this example, a processing tape T (tape cartridge C) of 24 mm width is mounted, and the kind of the tape is detected.

Subsequently, selection is made by the user of the processing mode (print-and-emboss processing mode, print-processing mode, emboss-processing mode) (S13), and inputting of the corresponding character information is made depending on the selected mode, thereby performing the label forming processing corresponding to each of the selected modes.

In other words, when the print-and-emboss processing mode is selected (S13: (a)), input is made of the character information (e.g., "A," "I," "U") for printing of ink characters and character information (e.g., "A, I, U") for Braille embossing by data inputting by the user through the keyboard 12, or the like (S14). The above-referenced character information may, of course, be different from each other. It is to be noted that, in FIGS. 5A to 5C and others, characters "A, I, U" are transliteration of Japanese hiragana and that the embossed Braille characters in those figures correspond to Japanese hiragana, and not to alphabets.

When the "print" key is depressed, the processing by the printing section 102 is performed. In other words, the processing tape T to be paid out of the tape cartridge C is subjected to printing of ink characters "A, I, U" on the rear side (label portion 38) and is subjected, on the front side (waste margin 37), to printing of the insert-direction mark 37*a* which indicates the direction of insertion of the processing tape T (S15). It is to be noted that the terms "rear" and "front" are used in relation to the direction of feeding (or traveling) of the processing tape T. Further, by means of the half cutter 34, a half-cut line 36 to separate the tape main body T1 into the waste margin 37 and the label portion 38 is formed and, by means of the full cutter 32, the processing tape T is ct off (S16), thereby ejecting the printed tape piece Ta out of the print-tape ejecting slot 19.

Subsequently, according to the insert-direction mark 37*a*, the tape piece Ta is manually inserted into the emboss-tape inserting portion 42. When the "emboss" key is depressed, the emboss processing by the embossing section 104 is performed. In other words, that tape piece Ta of the processing tape T which has been formed by passing through the printing section 102 is subjected to embossing of Braille characters "A, I, U" (S17). In this manner, a series of print-and-emboss processing is finished (see FIG. 5A). At this time, since the tape piece Ta is not inserted in the wrong direction (front and rear direction) thanks to the insert-direction mark 37*a*, it is possible to prevent the Braille-character array from being formed in the opposite direction (front and rear) relative to the ink-character array. It is also possible to prevent the Braille-character array from being wrongly formed on an upper-half area of the processing tape T of 24 mm width.

As described hereinabove, it is so arranged in this example that a printing region is provided on an upper half area and the embossing region is provided on a lower half area, respectively, of the processing tape T of 24 mm width (see FIG. 5A). It is also possible to employ a layout in which the printing region is provided on the lower half area and the embossing region is provided on the upper half area. Still furthermore, it is preferable that the layout is arranged to be selectable.

Then, when the print-processing mode is selected (S13: (b)), only the character information for ink-character printing (e.g., "A, I, U") is inputted (S24). Then, the processing tape T paid out of the tape cartridge C is subjected to print processing by the printing section 102 of the ink characters "A, I, U" on the label portion 38 (S25), and is also subjected to cutting (S26), thereby finishing the processing (see FIG. 5B). In this case, unlike the print-and-emboss processing mode, the printing of the insert-direction mark 37*a* is not made.

Finally, when the emboss-processing mode is selected (S13: (c)), only the character information (e.g., "A, I, U") for Braille embossing is inputted (S34). Then, the processing tape T paid out of the tape cartridge C is subjected to printing of the inset-direction mark 37*a* at the front end thereof (waste margin 37), and is subjected to tape feeding by the printing section 102 by the cutting length set based on the inputted character information (embossing data). Further, a half-cut line 36 for dividing the processing tape T into the waste margin 37 and the label portion 38 is formed by means of the half cutter 34. The processing tape T is also cut off by the full cutter 32 (S36) to thereby eject out of the print-tape ejection slot 19 a tape piece Ta on which nothing has been printed. In this example, the printing section 102 may also be arranged that the insert-direction mark 37*a* is not printed.

Figure 5:
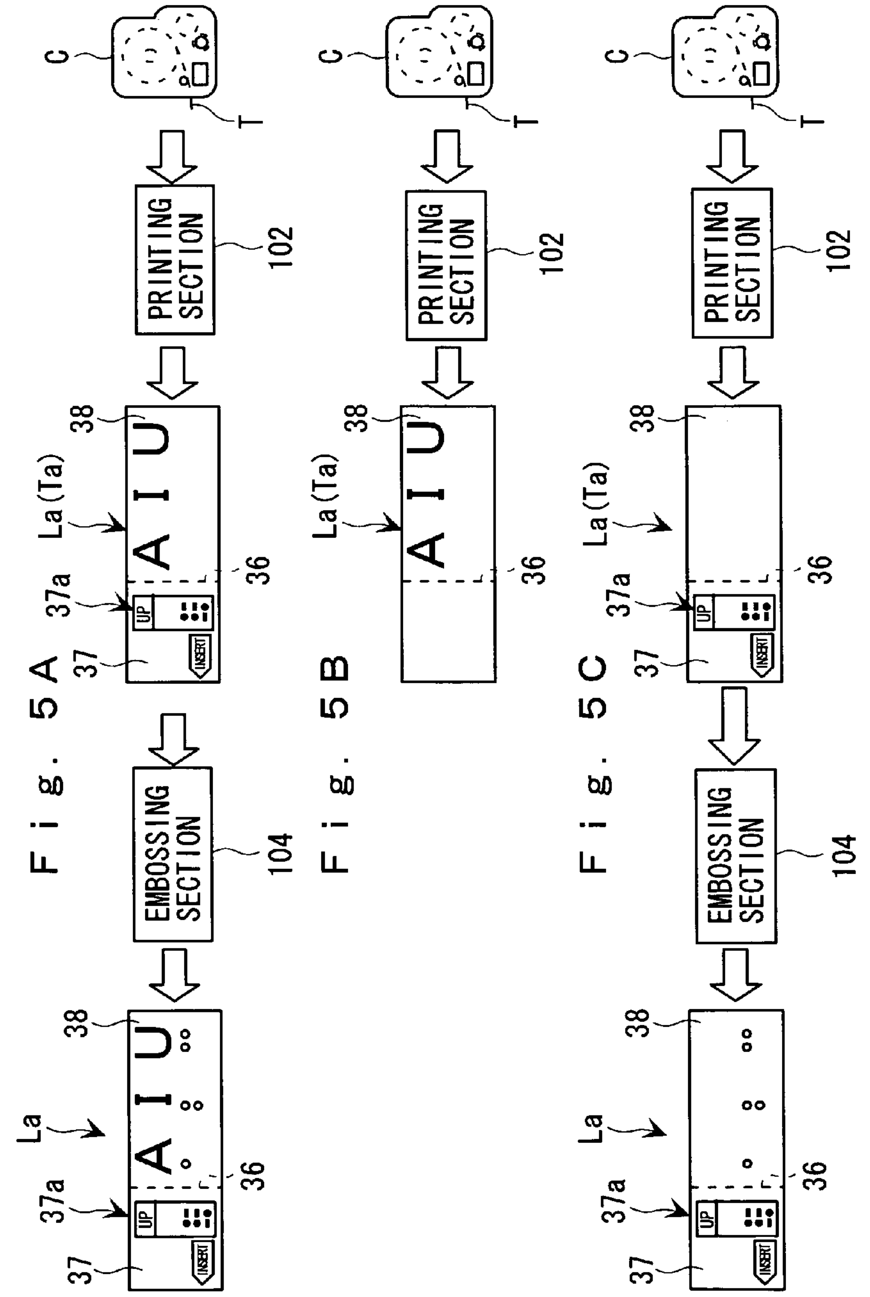
FIGS. 5A to 5C are diagrams schematically showing an overall processing of the label forming apparatus.
Figure 6:
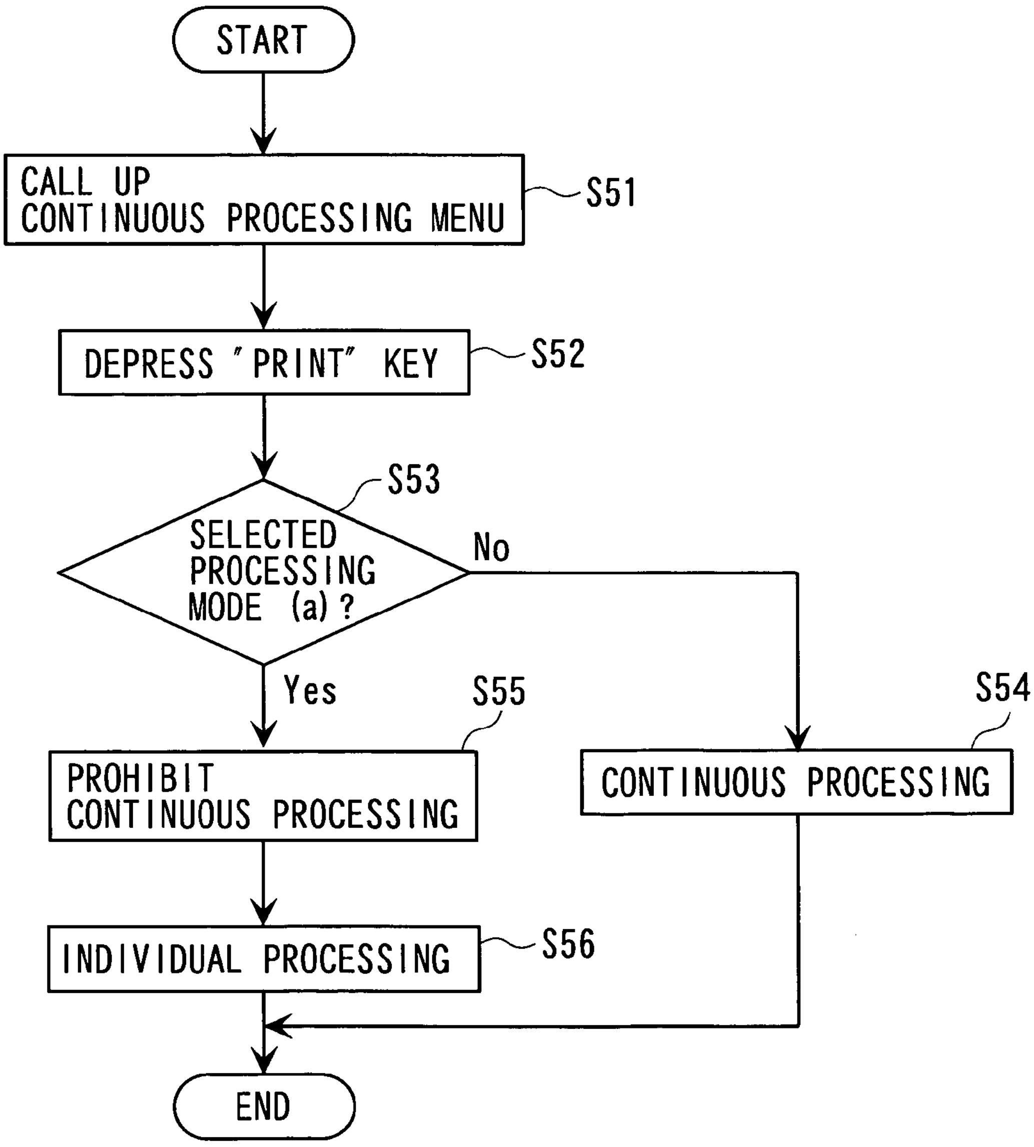
FIG. 6 is a flow chart showing a continuous processing and an individual processing of the label forming apparatus.

Thereafter, the tape piece Ta inserted into the emboss-tape inserting portion 42 is subjected to embossing of Braille characters ("A, I, U") by means of the embossing section 104 (S37) (see FIG. 5C). Instead of the tape piece Ta to be obtained by the tape-feed operation and the tape cutting operation in the printing section 102, an elongated rectangular processing tape T cut in advance into an appropriate length may alternatively be manually inserted into the emboss-tape inserting portion 42.

Now, with reference to FIGS. 6 to 10, a description will be made about a continuous processing and individual processing in the label forming apparatus 1. The label forming apparatus 1 has a continuous processing menu. In the above-referenced print processing and the emboss processing, a continuous processing is allowed in which a single continuous label L containing therein a plurality of labels La is formed. In the print-and-emboss processing, this continuous processing is prohibited and, based on this prohibition, an individual processing is performed in which a plurality of labels La are formed in succession as individual (separate) labels.

A concrete description will now be made. A description will be made about an example in which five labels La having printed thereon "A, I, U" are formed by selecting the print-processing mode. First, character information "A, I, U" for ink-character printing is inputted through the keyboard 12, or the like, and a "continuous-process" key is depressed to thereby call up the continuous processing menu (S51 in FIG. 6) and the number "5" of sheets (or pieces) to be formed is inputted. Then, when the "print" key is depressed (S52), a continuous processing of forming a continuous label L having five labels La in series is performed (S54).

In other words, the printing section 102 performs five times of printing "A, I, U" on the processing tape T paid out of the cartridge C. Further, by means of the half cutter 34, a half-cut line 36 is formed on the border between the respective adjoining labels La and, by means of the full cutter 32, the rear end of the continuous label L is cut off. In this manner, there can be obtained a continuous label L (tape piece Ta) in which five labels La having respectively printed thereon ink characters "A, I, U" are held in a continuous manner (see FIG. 7).

According to this configuration, five labels La can be formed by depressing the "print" key only once instead of depressing it many times (five times in this particular example). In addition, since the five labels La are held together in series, they can be prevented from getting scattered while storing, thereby allowing easy storing. Still furthermore, the border among the respective adjoining labels La of the continuous label L has been half-cut. Therefore, at the time of adhering each of the labels La of the continuous label L to an object of adhering (i.e., an object to which each of the labels is to be adhered), each of the labels La (tape main body T1) can be easily peeled off by taking advantage of the half-cut portion without using a pair of scissors, or the like.

Next, a description will be made about an example in which the emboss-processing mode is selected to thereby form five labels La each having embossed thereon Braille characters "A, I, U." First, "A, I, U" are inputted through the keyboard 12, or the like as the character information for Braille embossing, and also the "continuous-process" key is depressed to call up a continuous processing menu (S51). The number of "5" representing the pages to be formed is inputted. When the "print" key is depressed (S52), the above-referenced continuous processing is performed (S54) since the emboss-processing mode has been selected (S53: No).

In other words, the printing section 102 prints the insert-direction mark 38 on the waste margin 37 of the processing tape T paid out of the tape cartridge C, feeds the processing tape T by the set cut-length, and cuts the processing tape T at the rear end of the continuous label L made up of five labels La in series. Each of the labels La is thus subjected to embossing thereon of Braille characters "A, I, U" in the subsequent emboss processing (see FIG. 8, upper-side image). Here, unlike the above-referenced print-processing mode, an arrangement is made such that a half-cut line 36 is not formed on the border between the respective adjoining five labels La. Therefore, there is no possibility of forming labels La in which the half-cut line 36 and the embossed portion are displaced from each other.

Subsequently, the continuous label L (tape piece Ta) thus obtained is manually inserted into the emboss-tape inserting portion 42 and the "emboss" key is depressed. The embossing section 104 performs the embossing operation of Braille characters "A, I, U" five times. There can thus be obtained a continuous label L in which five labels La are held in series, each label La being embossed with Braille characters "A, I, U" (see FIG. 8, lower-side image). In the emboss-processing mode, as described above, the half-cut line 36 is not formed on the border between respective adjoining labels La. Therefore, the user must cut off each label La by means of a pair of scissors, or the like. It may therefore be so arranged that, also in the emboss-processing mode, the continuous processing is prohibited to thereby perform individual processing like in the print-and-emboss processing mode which is described hereinafter.

Finally, a description will now be made about an example in which the print-and-emboss processing mode is selected to thereby form five labels La each having printed thereon ink characters "A, I, U" and having embossed thereon Braille characters "A, I, U." First, inputting is made through the keyboard 12, or the like, of "A, I, U" as the character information for printing the ink characters, and also of "A, I, U" as the character information for embossing Braille characters. The "continuous-process" key is depressed to call up the continuous processing menu (S51) and input the number of "5" representing the number of sheets (or pieces) to be formed. Then, when the "print" key is depressed (S52), the above-referenced continuous processing is prohibited (S55) unlike the example in the above-referenced print-processing mode and the emboss-processing mode, since the print-and-emboss processing mode has been selected here. Based on this prohibition, the individual processing for individually forming five labels La is performed (S56).

In other words, should the continuous processing be allowed in the print-and-emboss processing mode, there will occur the following problem. Namely, due to the error between the amount of tape feeding by the feeding mechanism in the printing section 102 and the amount of tape feeding by the feeding mechanism in the embossing section 104, there will occur a displacement in the tape-feeding direction between the printed portion and the embossed portion in each label La. This displacement becomes remarkable toward the rear end of the continuous label L. In the end, as a result of displacement of the embossed portion relative to the half-cut line 36 between the respective adjoining labels La, the embossed portion at the end of the continuous label L will misalign with the preceding (i.e., front-side) adjoining label La. Namely, Braille characters partly merge into the preceding adjoining label La (see FIG. 10).

As a solution, the continuous processing is prohibited and an individual processing is performed instead. In concrete, each time the ink characters "A, I, U" are printed, the printing section 102 performs full cutting by the full cutter 32 at the rear end of each label La, and this procedure is repeated five times. Subsequently, each of the labels La (label piece Ta) thus obtained is manually inserted into the emboss-tape inserting portion 42, and the "emboss" key is depressed. Then, the embossing section 104 embosses the Braille characters "A, I, U." By repeating this embossing operation, there can be individually formed five labels La each having embossed thereon the Braille characters "A, I, U" (see FIG. 9).

According to this configuration, there is no possibility that a plurality of labels La are formed in which the printed portion and the embossed portion of each of the labels La are displaced from each other in the tape-feeding direction. In addition, by performing individual processing, in place of the continuous processing, the printed portion and the embossed portion of each of the labels La will not be displaced from each other. As a result, there can be formed a plurality of labels La in which the ink characters and the Braille characters are indicated without being displaced from each other.

As described hereinabove, according to the label forming apparatus 1 of this embodiment, there is no possibility that a plurality of labels La are formed in which the printed portion and the embossed portion are displaced from each other in the tape-feeding direction.

As a label forming apparatus to which this invention is applied, a description has so far been made about a complex apparatus in which both the print processing and the emboss processing can be performed on the processing tape. This invention can also be applied to a complex apparatus in which the print processing and other physical processing can be performed in place of the emboss processing. The term "physical processing" is also referred to as "physical work processing" or "work processing" to mean "processing to cause to produce some kind of change."

For example, this invention can also be applied to a label forming apparatus in which character array, or the like is printed on a processing tape made up of a tape main body and a release tape, and then only the tape main body is half-cut into an arbitrary stamped shape, thereby forming a label.

Although not shown, this label forming apparatus is made up of: a printing section which performs printing, based on inputted information, on a processing tape to be paid out of the mounted tape cartridge and also performs cutting (full cutting) to separate the processed portion; and a cutting section which performs half cutting of only the tape main body, based on the inputted information, by cooperation of a feeding mechanism which moves the separated tape piece (printed portion) back and forth and a cutting bite which is caused to reciprocate in a direction at right angles to the moving direction of the separated tape piece.

In a manner similar to that of the above-referenced embodiment, a selection is made in the label forming apparatus from among: a print-and-stamp processing mode in which both printing and stamping are performed on the processing tape; a print-processing mode in which only printing is performed; and a stamp-processing mode in which only stamping is performed. Depending on the selection of the mode, the print-and-stamp processing, print processing, and stamp processing are selectively performed. In addition, in the print processing and the stamp processing, a continuous processing is prohibited and, based on this prohibition, an individual processing is performed in which a plurality of labels are formed individually.

Figure 11A:
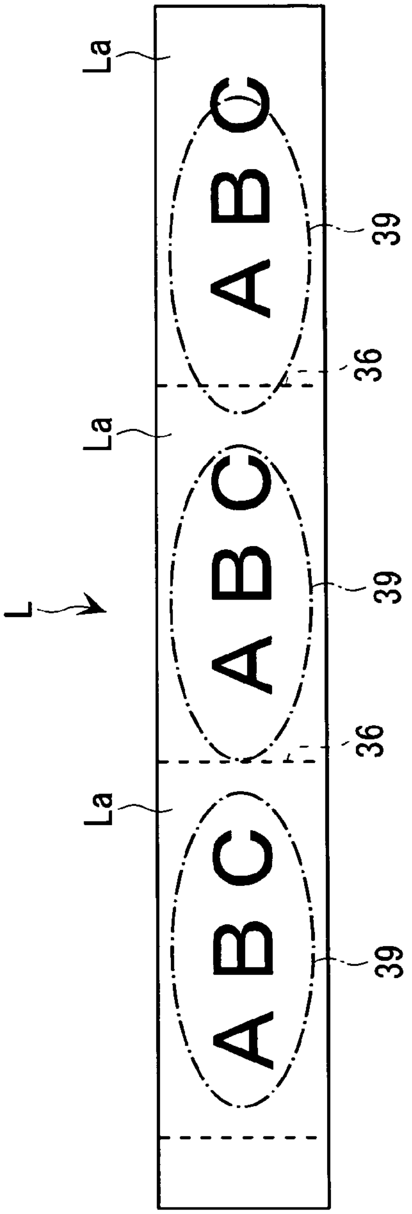
FIGS. 11A and 11B are diagrams schematically showing the continuous processing and the individual processing, respectively, of the label forming apparatus according to another embodiment.

Should the continuous processing be allowed in the stamp-processing mode, there will occur the following problem. Namely, due to an error between the amount of tape feeding by the feeding mechanism in the printing section and the amount of tape feeding by the feeding mechanism in the stamping section, there will occur a displacement in the tape-feeding direction between the printed portion and the stamped portion (stamping line 39) in each label La. This displacement becomes remarkable toward the rear end of the continuous label L. As a result of displacement of the stamping line 39 relative to the half-cut line 36 between the respective adjoining labels La, the stamping line 39 will misalign with each other. In the end, the preceding (or front-side) adjoining label La will merge into the preceding (front-side) adjoining label La (see FIG. 11A).

Figure 11B:
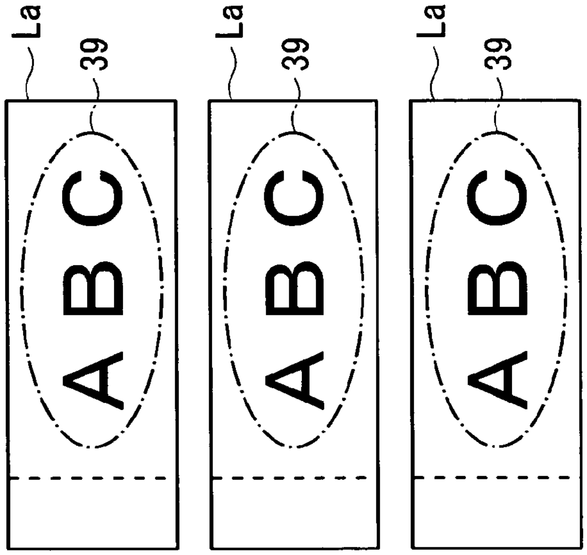

As a solution, this kind of continuous processing is prohibited and an individual processing is performed instead. In concrete, the character array "A, B, C" is printed three times and full cutting is performed at the rear end of each of the labels La. Subsequently, the stamping section forms an elliptical stamping line 39 so as to enclose the character array "A, B, C." By repeating the above-referenced full cutting, there can be obtained three labels La each having formed thereon the character array "A, B, C" and the stamping line 39, respectively (see FIG. 11B).

As described hereinabove, according to this label forming apparatus, there is no possibility of forming a plurality of labels La in which the printed portion and the portion processed ready for stamping are displaced from each other in the tape-feeding direction.

It is further understood by those skilled in the art that the foregoing is the preferred embodiment of the invention, and that various changes and modifications may be made without departing from the spirit and scope thereof.

What is claimed is:

1. A label forming apparatus comprising:

a printing section for performing printing while feeding a processing tape wound into a roll, the processing tape including a tape main body and a release tape, and the printing section including a cutting device for cutting the processing tape and a half cutter for cutting only the tape main body;

a working section for performing physical working on the processing tape while feeding the processing tape, the apparatus selectively performing print processing for performing printing, work processing for performing physical working on a piece of the processing tape formed by passing through the printing section, print-and-work processing for performing printing and physical working on the pieces of the processing tape formed by passing through the printing section based on inputted information, and continuous processing for forming a single continuous label in which a plurality of labels are formed in series;

a processing selection device for selecting from among the print processing, the work processing, and print-and-work processing; and a control device for controlling the printing section and the working section, wherein the control device allows the continuous processing when the print processing and the work processing are selected, and prohibits the continuous processing when the print-and-work processing is selected, wherein when print-and-work processing is selected, the control device performs individual processing of forming a plurality of labels in succession as individual labels based on prohibition of continuous processing, the control device controls the cutting device to perform cutting of the processing tape at a rear end of the continuous label in continuous processing and to perform cutting of the processing tape at a rear end of each of the labels in individual processing, and the control device controls the half cutter to perform half cutting in which a border of the plurality of respectively adjoining labels is half-cut in continuous processing and prohibit half cutting in the continuous processing of the work processing.

2. The apparatus according to claim 1, wherein the processing section further comprises an embossing device for embossing Braille characters on the processing tape.

3. The apparatus according to claim 1, wherein the processing tape includes a tape main body and a release tape, and wherein the working section includes a cutting device for half-cutting the tape main body of the processing tape into an arbitrary punched shape.

4. A method for forming a label with a label forming apparatus comprising: a printing section for performing printing while feeding a processing tape wound into a roll, the processing tape including a tape main body and a release tape, and the printing section including a cutting device for cutting the processing tape and a half cutter for cutting only the tape main body; a working section for performing physical working on the processing tape while feeding the processing tape, the apparatus selectively performing print processing for performing printing, work processing for performing physical working on a piece of the processing tape formed by passing through the printing section, print-and-work processing for performing printing and physical working on the pieces of the processing tape formed by passing through the printing section based on inputted information, and continuous processing for forming a single continuous label in which a plurality of labels are formed in series, the method comprising:

selecting from among print processing, work processing, and print-and-work processing;

allowing continuous processing when print processing and work processing are selected;

prohibiting continuous processing and performing individual processing of forming a plurality of labels in succession as individual labels when print-and-work processing is selected;

cutting the processing tape with the cutting device at a rear end of the continuous label in continuous processing and cutting the processing tape with the cutting device at a rear end of each of the labels in individual processing; and half cutting a border of respectively adjoining labels with the half cutter in continuous processing and prohibiting half cutting in the continuous processing of the work processing.

* * * * *